No. 743,797. PATENTED NOV. 10, 1903.
C. E. ALLEN.
HEAT INSULATOR FOR HANDLED VESSELS.
APPLICATION FILED JULY 20, 1903.
NO MODEL.
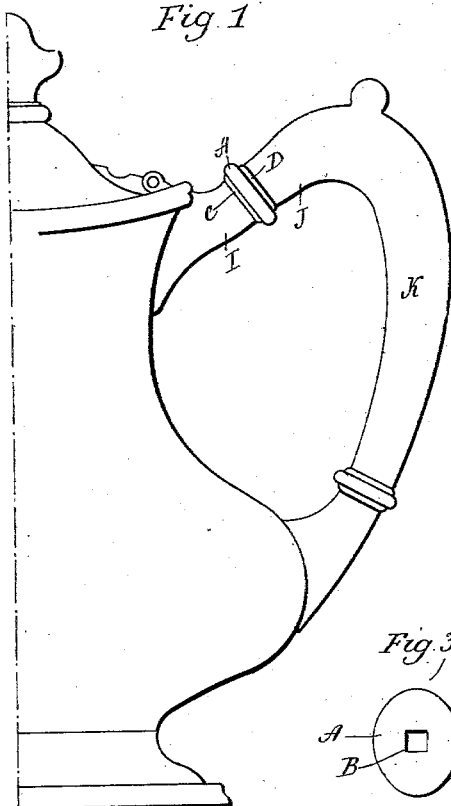
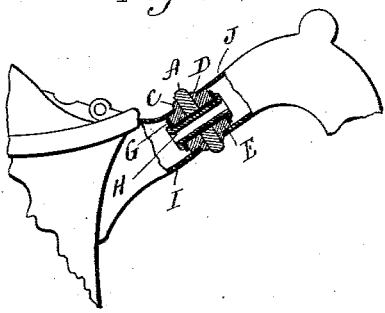
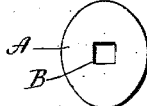 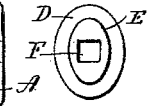 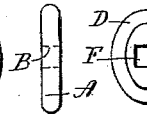 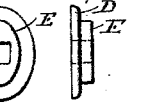 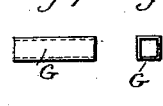 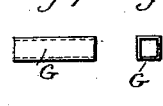
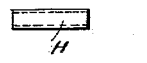 

No. 743,797. Patented November 10, 1903.

UNITED STATES PATENT OFFICE.

CHARLES E. ALLEN, OF WALLINGFORD, CONNECTICUT, ASSIGNOR TO R. WALLACE & SONS MFG. CO., OF WALLINGFORD, CONNECTICUT, A CORPORATION.

HEAT-INSULATOR FOR HANDLED VESSELS.

SPECIFICATION forming part of Letters Patent No. 743,797, dated November 10, 1903.

Application filed July 20, 1903. Serial No. 166,217. (No model.)

*To all whom it may concern:*

Be it known that I, CHARLES E. ALLEN, of Wallingford, in the county of New Haven and State of Connecticut, have invented a new and useful Improvement in Heat-Insulators for Handled Vessels; and I do hereby declare the following, when taken in connection with the accompanying drawings and the letters of reference marked thereon, to be a full, clear, and exact description of the same, and which said drawings constitute part of this specification, and represent, in—

Figure 1, a side view of a portion of a handled vessel having insulators applied thereto; Fig. 2, a sectional view of an insulator embodying my invention and shown as inserted between the end of a handle and a vessel-socket; Fig. 3, a plan view of insulator-disk; Fig. 4, a rear view thereof; Fig. 5, a plan view of one of the plates; Fig. 6, an edge view thereof; Fig. 7, a side view of the insulator-sleeve; Fig. 8, an end view thereof; Fig. 9, a side view of the rivet; Fig. 10, an end view thereof.

This invention relates to an improvement in heat-insulators for handled vessels—that is, a device inserted between the ends of a handle and sockets secured to a vessel to prevent heat from the vessel passing to the handle portion—the object being a simple construction and arrangement of parts which may be produced at very low cost; and the invention consists in the construction, as will be hereinafter described, and particularly recited in the claims.

In carrying out my invention I employ a disk A, of fiber, ivory, or other insulating material and oval or round, according to the design of the handle or pot to which it is to be applied. The edge of this disk is rounded, and in the center is a hole B, preferably square. On opposite sides of this disk are plates C D, of metal, similar in shape to the shape of the disk A, but of smaller dimensions. On the outer face of each of these plates is a shoulder E, and in the center of each is a hole F, corresponding to the hole B in the disk A. Extending through the holes B and F is a sleeve G, of fiber or other insulating material, and in the sleeve is a rivet H, preferably tubular and corresponding in shape to the shape of the holes B and F. The length of the sleeve G is greater than the length of the rivet, and both are longer than the combined thickness of the disk and plates, so that the sleeve and rivet project beyond the outer face of the plates. The ends of the rivets are upset, so as to unite the disk and plates, and the sleeve G insulates the rivets from the plates, which by the disk A are insulated from each other. The insulator thus formed is inserted between the usual sockets I J and the ends of the handle K, the shoulders E corresponding to the ends of the socket and handle, so as to form a convenient surface whereby the plates may be soldered or otherwise secured to the said sockets and handle. It will thus be seen that the plates are completely insulated from each other and the rivet by which they are united is insulated from both. A hollow rivet is preferably employed, as its ends are more readily upset, and a square rivet is preferable to a round rivet, as in case of oval plates and disks the square rivet assures the proper location of the parts.

Having fully described my invention, what I claim as new, and desire to secure by Letters Patent, is—

1. An insulator for handled vessels comprising a disk of insulating material, metal plates arranged on opposite sides thereof, a rivet extending through said disk and plates, and a sleeve of insulating material around said rivet and under the opposite ends thereof, substantially as described.

2. An insulator for handled vessels comprising a disk of insulating material, plates arranged on opposite sides thereof, said plates formed with shoulders on their outer faces, said disk and plates having holes extending through them, a sleeve of insulating material passing through said holes, and a rivet extending through said sleeve and upset over the outer faces of said plates, the ends of the sleeve insulating the ends of the rivet from the plates, substantially as described.

In testimony whereof I have signed this specification in the presence of two subscribing witnesses.

CHARLES E. ALLEN.

Witnesses:
W. B. HALL,
C. R. TIFFANY.